(12) United States Patent
Naghian

(10) Patent No.: US 7,054,646 B2
(45) Date of Patent: May 30, 2006

(54) TRANSMISSION METHOD IN A COMMUNICATION SYSTEM

(75) Inventor: Siamäk Naghian, Espoo (FI)

(73) Assignee: Nokia Corporation, Espoo (FI)

( * ) Notice: Subject to any disclaimer, the term of this patent is extended or adjusted under 35 U.S.C. 154(b) by 407 days.

(21) Appl. No.: 10/272,282

(22) Filed: Oct. 17, 2002

(65) Prior Publication Data

US 2004/0077350 A1 Apr. 22, 2004

(51) Int. Cl.
*C10L 1/20* (2006.01)

(52) U.S. Cl. .................. 455/456.1; 455/436; 455/440; 455/441

(58) Field of Classification Search ............. 455/456.1, 455/436, 440, 441
See application file for complete search history.

(56) References Cited

U.S. PATENT DOCUMENTS

| | | | |
|---|---|---|---|
| 6,167,248 A * | 12/2000 | Hamalainen et al. | ....... 455/403 |
| 6,253,084 B1 | 6/2001 | Monot | |
| 6,445,917 B1 | 9/2002 | Bark et al. | |
| 6,522,888 B1 * | 2/2003 | Garceran et al. | ........ 455/456.3 |
| 6,810,259 B1 * | 10/2004 | Zhang | ..................... 455/456.5 |
| 2002/0102976 A1 | 8/2002 | Newbury et al. | |
| 2002/0126664 A1 * | 9/2002 | Kiiski et al. | ................. 370/389 |
| 2004/0053630 A1 * | 3/2004 | Ramos et al. | ................ 455/500 |

FOREIGN PATENT DOCUMENTS

WO    WO 03/081938 A1    10/2003

OTHER PUBLICATIONS

Festag A. et al. *Proceedings of the IEEE Conference on High Performance Switching and Routing 2000 Heidelberg, Germany* "Rerouting for handover in Mobile Networks with Connection-Oriented Backbones: An Experimental Testbed", pp. 491-499.

Bakshi et al. *21st IEEE Proceedings on Local Computer Networks, 1996 publ Oct. 1996, Minneapolis USA* "Providing Seamless Communication in Mobile Wireless Networks", pp. 535-543.

* cited by examiner

*Primary Examiner*—Joseph Feild
*Assistant Examiner*—S. Smith
(74) *Attorney, Agent, or Firm*—Squire, Sanders & Dempsey LLP

(57) ABSTRACT

The invention relates to a transmission method in a communication system. In order to devise a mechanism for providing seamless connections in an efficient way, location-dependent parameter sets are utilized, each parameter set containing at least one parameter indicative of the location of a mobile node. A group of variables associated with the mobile node is monitored, the group containing at least one variable of which at least one is derived from said parameters. The current value of said at least one variable is compared with predetermined first criteria, and a multicast-based operation mode is selected when said at least one variable meets the predetermined first criteria. In the multicast-based operation mode, data destined for the mobile node is transmitted (1) to the current access point and (2) to a set of potential new access points prior to a handover. (FIG. 2)

24 Claims, 3 Drawing Sheets

TRANSMISSION METHOD IN A COMMUNICATION SYSTEM

FIELD OF THE INVENTION

The invention relates generally to a transmission method in a communication system. The method is preferably utilized in connection with handovers performed in the system, but it can also be used for other purposes, as described below. The invention also relates to a system and network element capable of performing the method.

BACKGROUND OF THE INVENTION

As is known, in the mobile communication environments the maintenance of a traffic connection with a mobile station is made possible with the help of a handover function. In a handover, which is also called a handoff, a new connection is established with a new coverage area, such as a cell, and the connection with the old coverage area is released, i.e. the mobile station and its traffic connection are handed over to a new cell. Along the convergence of the Internet and wireless communication, mobility support has also been developed for IP networks. IETF (Internet Engineering Task Force) has defined a mechanism for supporting mobility in IP networks. The official name of the mechanism is IP Mobility Support, but it is also called Mobile IP. Mobile IP describes the basic operations needed for a mobile node to maintain its connectivity to the Internet during its handover from one IP access point to another.

Due to the increasing mobility in the networks, the handover mechanisms have to be developed continually. There are two major problems associated with this development process: the data loss which a handover causes if no extra measures are taken and the latency related to the handover. Furthermore, these two problems are interconnected; the faster the handover, the shorter the period during which packets can be lost.

The proposals for eliminating data loss in connection with a handover are mostly based on the buffering of data in one or more routers (access points). One solution is based on multicast transmission, i.e. the same data is transmitted to several routers (access points) surrounding the router currently forming the access point of the node. Thus, the data is already available for the mobile node when it performs a handover.

As a handover involves various operations, such as location update and rerouting of the data, the combined latency can be appreciable, at least for some applications. Thus, there is also a need for fast handovers which reduce this latency. Latency caused by rerouting of the data can be minimized by so-called predictive handover schemes, where the potential access points are predicted and the connection is pre-established to these access points.

The article "An IP Mobility Support Architecture for the 4GW Wireless Infrastructure" by Jian Wu, at the website http://www.s3.kth.se/radio/4GW/public/Papers/JWWS99.pdf (visited in September 2002), describes a method for tackling the latency problem. The paper describes a new network architecture including an additional agent, Mobility Support Agent (MSA), added to the IP subnetworks. Prior to a handover, the mobile node pre-registers itself with the MSA of the relevant neighboring subnetwork. This MSA then negotiates with a designated router or the home agent of the mobile node in order to redirect the traffic so that it is available for the mobile node when the node arrives at the new sub network.

The article "MOMBASA: Mobility Support—A Multicast-based Approach", by A. Festag and A. Wolisz, available at the website http://www-tkn.ee.tu-berlin.de/publications/papers/festag_ew2000.pdf (visited in September 2002), describes a predictive handover scheme in which the base stations which are potential candidates for the handover of the mobile form a set. The set can be optimized using topological knowledge.

With the rapid increase of wireless services and mobility towards truly mobile computing and networking, with computing devices commonplace in all kinds of vehicles, for example, the ability to provide seamless connections becomes even more important. Furthermore, with diminishing cell sizes in conventional mobile networks and with short-range radio systems and ad-hoc networks becoming more common, the maintenance of seamless connections will be more and more demanding. Therefore, the problem of achieving seamless communications in an efficient way, i.e. without excessive consumption of existing network resources and without a need for additional network elements, will be more and more emphasized.

SUMMARY OF THE INVENTION

The objective of the invention is to accomplish a solution for the above-mentioned problem. In other words, the objective of the invention is to devise a mechanism for providing seamless connections in an efficient way in mobile communication environments.

The idea of the present invention is to implement the above-mentioned predictive multicast-based approach in a new way. In the present invention the location parameters available in the network are utilized for monitoring at least one variable derivable from the location parameters. These variables are continuously monitored and compared to predetermined threshold criteria. When the variable(s) of a node meet(s) the threshold criteria, the multicast-based operation mode is entered with respect to this node, whereby a certain set of potential access points is selected for handover support, and the data destined for the node is transmitted (i.e. multicast) to these access points, which can be stationary or mobile elements/nodes.

As the variables are monitored continuously, the system can return to the normal operation mode as soon as the variable(s) meet predetermined return criteria. In this way, the network can determine the extent to which multicasting is utilized to support handovers and whether multicasting is necessary at all. In other words, the network can dynamically decide whether the additional consumption of resources required by multicasting is required in order to guarantee sufficient service quality in terms of connectivity.

As is obvious from the above, in this context the terms "multicast-based" and "multicasting" refer to the delivery of the data destined for the mobile node or station to potential new access points, such as base stations and wireless routers, the delivery being performed prior to a handover so that the data is already available at the new access point when the handover occurs. The method of the invention can be applied to both multicast and unicast traffic, i.e. the data which is delivered to the plurality of access points can belong to one mobile node only (unicast traffic) or to a group of mobile nodes (multicast traffic).

The actual method of determining the location parameters is not essential in view of the invention, but rather the invention can utilize various methods. Consequently, the method of determining the location parameters can be network-based, network-assisted, mobile-assisted, or mobile-based.

The method of the invention classifies the mobile nodes dynamically in terms of their mobility pattern. For example, if the speed of the node is the variable being monitored, larger access areas are assigned to faster nodes than to slower ones, and if the speed is slow enough, no multicasting is necessary unless it is needed for other purposes, such as for improving the received signal quality. The term access area refers here to the combined coverage area of the potential access points.

The selection of the operation mode, i.e. normal operation or multicast-based operation mode, is preferably performed dynamically, a new selection being triggered by the occurrence of one or more predetermined events, such as the expiration of a timer set in connection with the latest selection and/or a certain event relating to the network load.

Thus one aspect of the invention is providing a transmission method for a communication system comprising a plurality of mobile nodes and an access network with a plurality of access points through which the mobile nodes are connected to the access network, the method comprising the steps of storing location-dependent parameter sets, each parameter set containing at least one parameter indicative of the location of a mobile node, monitoring a group of variables associated with the mobile node, the group containing at least one variable of which at least one is derived from said parameters, comparing the current value of said at least one variable with predetermined first criteria, and selecting a multicast-based operation mode, in which data destined for the mobile node is to be transmitted (1) to the current access point and (2) to a set of potential new access points prior to a handover, the multicast-based operation mode being selected when the step of comparing indicates that said at least one variable meets the predetermined first criteria.

In a further aspect the invention provides a system for the transmission of data in a communication system comprising a plurality of mobile nodes and an access network with a plurality of access points through which the mobile nodes are connected to the access network, the system comprising positioning means for determining location-dependent parameter sets, each parameter set containing at least one parameter indicative of the location of a mobile node, calculation means for forming a group of variables associated with the mobile node, the group containing at least one variable of which at least one is derived from said parameters, comparison means for comparing the current value of said at least one variable with predetermined criteria, and selection means for selecting a multicast-based operation mode, in which data destined for the mobile node is to be transmitted to the current access point and to a set of potential new access points prior to a handover, the selection means being adapted to select the multicast-based mode when said at least one variable meets predetermined first criteria.

In a still further aspect the invention provides a network element for a communication system comprising a plurality of mobile nodes and an access network with a plurality of access points through which the mobile nodes are connected to the access network, the network element comprising reception means for receiving location-dependent parameter sets, each parameter set containing at least one parameter indicative of the location of a mobile node, calculation means for forming a group of variables associated with the mobile node, the group containing at least one variable of which at least one is derived from said parameters, comparison means for comparing the current value of said at least one variable with predetermined first criteria, and selection means for selecting a multicast-based operation mode, in which data destined for the mobile node is to be transmitted to the current access point and to a set of potential new access points prior to a handover, the selection means being adapted to select the multicast-based mode when said at least one variable meets the predetermined first criteria.

The invention provides a mechanism for deciding in constantly changing network environments whether the consumption of the additional network resources caused by the multicast-based mode is required in order to guarantee sufficient quality of service in terms of connectivity. The invention also provides improvements in handover latency and signaling load, which are the critical factors in any handover mechanism and will be even more critical in the upcoming ad-hoc networks based on short-range radio systems. The invention reduces the handover latency, since no signaling is needed for redirecting the data to the new access point when the connection is handed over to that access point.

Furthermore, no extra measurements or network elements are needed in the existing networks for performing the method of the invention.

Other features and advantages of the invention will become apparent through reference to the following detailed description and accompanying drawings.

BRIEF DESCRIPTION OF THE DRAWINGS

In the following, the invention and its preferred embodiments are described more closely with reference to the examples shown in FIGS. 1 to 5 in the appended drawings, wherein.

DETAILED DESCRIPTION OF THE INVENTION

Figure 1:
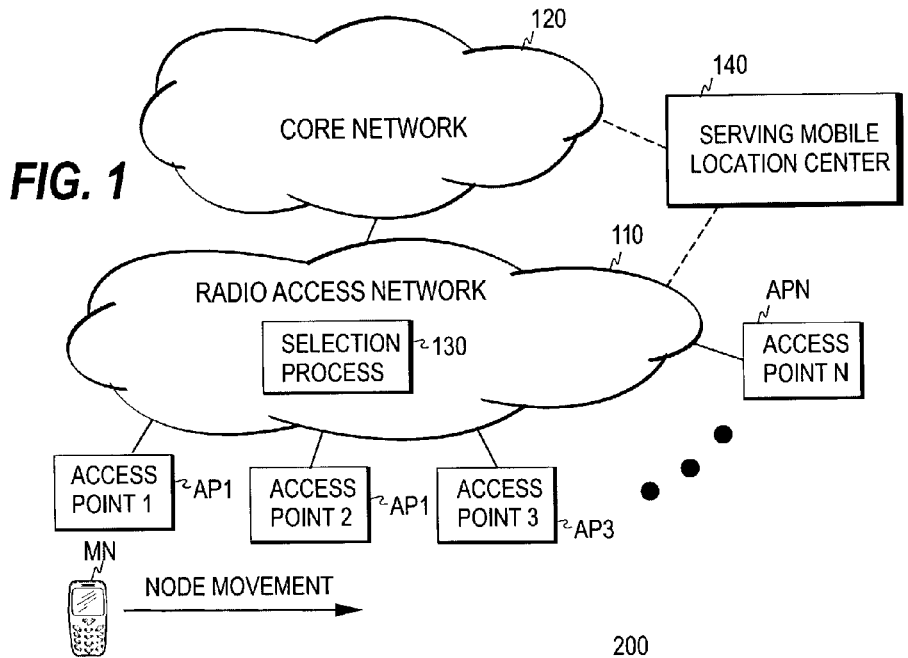
FIG. 1 illustrates a communication system to which the present invention can be applied.

FIG. 1 illustrates a communication system in which the present invention can be applied. The system comprises three interacting domains: mobile stations or nodes MN (only one shown in the figure), radio access network 110, and a core network 120. The radio access network comprises a plurality of access points APi (i=1 . . . N) through which the mobile nodes access the services provided in the core network or in the radio access network. As the present invention is not tied to a particular technology, but can be applied to any wireless network with a plurality of access points, the system is shown on a general level in FIG. 1. In case of UMTS technology, for example, the radio access network (UTRAN, Universal Mobile Telecommunication System Terrestial Radio Access Network) comprises a plurality of node B elements (not shown), which are the physical units for radio transmission/reception in the cellular network. Depending on the sectoring of its antennas, a node B can serve one or more cells, i.e. one node B can serve as one or more access points APi. In addition to the node B elements, the UTRAN further comprises Radio Network Controllers (RNC), each connected to a set of node B elements and each being responsible for the control of the radio resources in its domain, i.e. in the set of node B elements connected to it. The Radio Network Controllers form the service access points for the services the UTRAN provides to the core network.

The system of the invention further includes one or more network elements 130 containing the selection process according to the invention. This process can be introduced into an existing network element, such as the Radio Network Controller, or it can be performed by a server being located at such a network element. The details of the process are discussed below.

The system of the invention further includes a Serving Mobile Location Center (SMLC) 140, which provides the location-dependent information required by the selection process. This network element can be in the core network or in the radio access network, and the location-dependent information provided by it can be in various forms. The determination of the mobile position is based on the propagation characteristics of a radio wave signal sent to or from the mobile station, using the delay and the direction of the signal between the transmitter and the receiver to determine a position. Therefore, the accuracy and complexity of such methods tend to be dependent on the characteristics of the radio channel. Many different methods have been developed for mobile positioning. They can be categorized according to how they utilize the radio signal characteristics for determining the location of the mobile station. In addition to those methods that utilize general cell information when determining the positioning of the mobile, the most important examples of current positioning methods are: Round Time Trip (RTT), Timing Advance (TA), Time Of Arrival (TOA), Different Time Of Arrival (DTOA), Angle Of Arrival (AOA), Signal strength-based such as Reference Node-Based Positioning (also called local positioning).

Positioning a mobile involves two main steps: signal measurements and computation of the estimated location based on the measurements. Therefore, positioning methods may be further categorized according to where the measurements and calculation are performed. The following categories can be identified:

1. Network-Based positioning; the network performs signal measurements and computes the location estimate of the mobile.

2. Mobile-Based positioning; the mobile performs signal measurements and computes its own location estimate.

3. Mobile-Assisted Network-Based positioning; the mobile performs and reports signal measurements to the network, and the network computes the location estimate of the mobile.

4. Network-Assisted Mobile-Based positioning; the network performs and reports signal measurements to the mobile, and the mobile computes its own location estimate.

The assistance data provided by the network or the mobile in an assisted method can also contain information extracted from other systems, such as the Global Positioning System (GPS).

However, the present method does not depend on the type of the location method and it can therefore be used with implementations based on different types of location methods.

Figure 2:
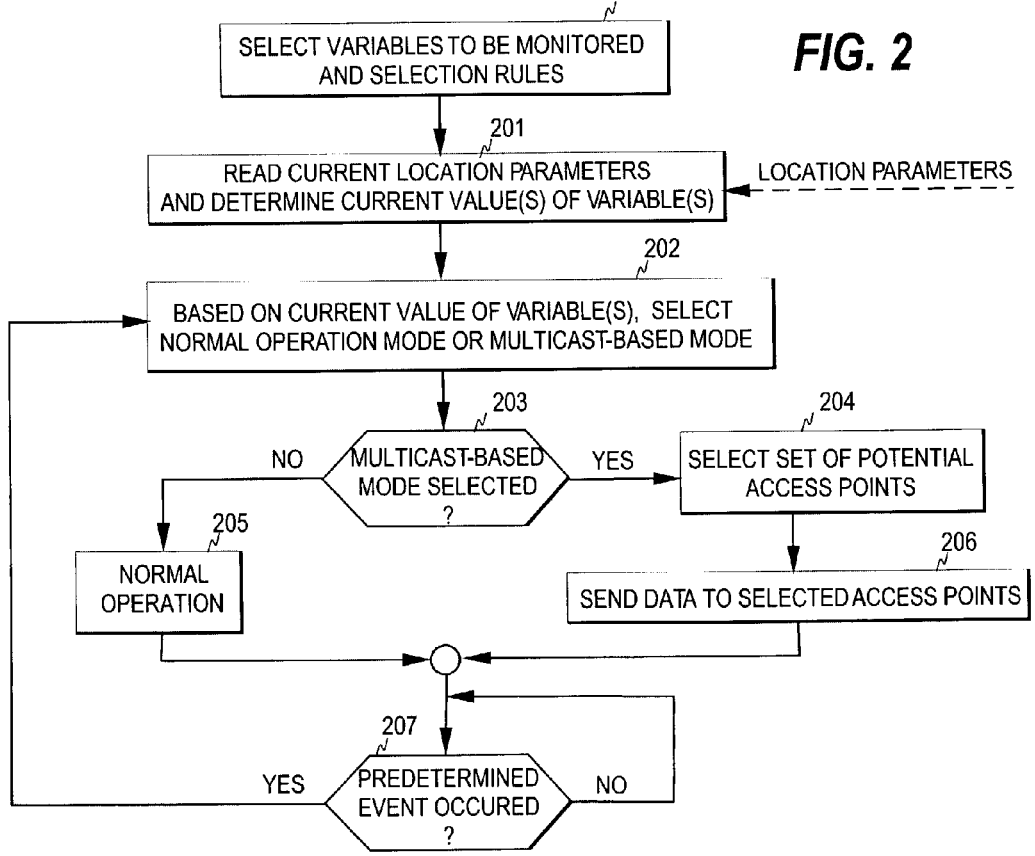
FIG. 2 is a flow diagram illustrating the basic operations of the invention.

FIG. 2 illustrates the determination of the operation mode and the set of potential access points for a mobile node. Prior to the application of the actual dynamic and continuous method to a mobile node, one or more variables to be monitored are selected for the relevant mobile node MN, at least one of the variables being derivable from the location parameters available in the network. In this illustration the speed of the node is used as an example of the variable to be monitored. Furthermore, for the variable(s) selected, the criteria are then defined which determine the current operation mode (normal or multicast-based) and the set of potential access points to which the data is delivered in the multicast-based mode. When speed is the variable, the criteria typically include a certain speed value for determining whether the multicast-based mode is entered and one or more speed values for defining the set of potential access points in the multicast-based mode. For example, two different speed values $v1$ and $v2$ ($v1<v2$) could be used so that $v1$ is the threshold value determining the mode of operation. If the speed of the mobile is lower than $v1$, the multicast-based mode is not used. If the speed is higher than $v1$, the rule for selecting the potential access points depends on the current location and the speed of the node, i.e. whether the speed is lower or higher than the next limit value $v2$.

Different rules are thus used in the multicast-based mode, depending on the speed of the mobile node. In addition to the speed, the overall mobility pattern of the mobile node and the environmental and/or topological information related to the current location of the mobile are preferably used in determining the potential set of access points. As mentioned above, the variable(s) and the associated threshold values and rules have to be determined (step 200) before the actual method can be used in the communication system.

When the above steps have been performed, the application of the method with respect to the mobile node can be started. The selection process reads the current input data (step 201), which preferably contains the current values of the location parameters available from the mobile location center. The selection process then uses these parameters, together with previous parameters, to estimate the current speed and direction of the node. The variable can also be determined elsewhere in the network, whereby the selection process receives the current values of the variable(s).

Based on the current value(s), the selection process selects the operation mode, i.e. the normal operation mode or the multicast-based operation mode (step 202). If the current speed of the node is lower than the predetermined threshold $v1$, for example, the normal operation mode is selected. Otherwise, the multicast-based mode is entered.

The system of the invention preferably includes first criteria for entering the multicast-based mode and second criteria for leaving the multicast-based mode. In other words, different thresholds are preferably used at step 202 for entering and leaving the multicast-based mode. When speed is the variable, the mobile preferably leaves the multicast-based mode only when its speed has dropped to below a limit value smaller than the threshold for entering the multicast-based mode.

In the normal operation mode the network operates in a conventional manner (step 205), i.e. the data destined for the node is rerouted to a new access point in connection with the next handover. In the multicast-based mode, a set of potential access points is selected (step 204) according to the predetermined rule corresponding to the current speed, location, and direction of the movement of the node. For example, when the speed is below v2, one or two potential access points may be selected, and if the speed is equal to or greater than v2, two or three (or possibly even more) potential access points may be selected, depending on the network topology and on the current environment of the mobile.

When the set of potential access points has been selected, the data is sent to these access points (step 206). In addition it is still transmitted through the current access point. In this way, the data will be available for the node when the handover is performed.

A predetermined event triggers (step 207) a new selection for the operation mode, whereby a new set of potential access points is selected for the node or the system returns to the normal operation mode. The latter can happen if a moving node stops, for example.

Figure 3:
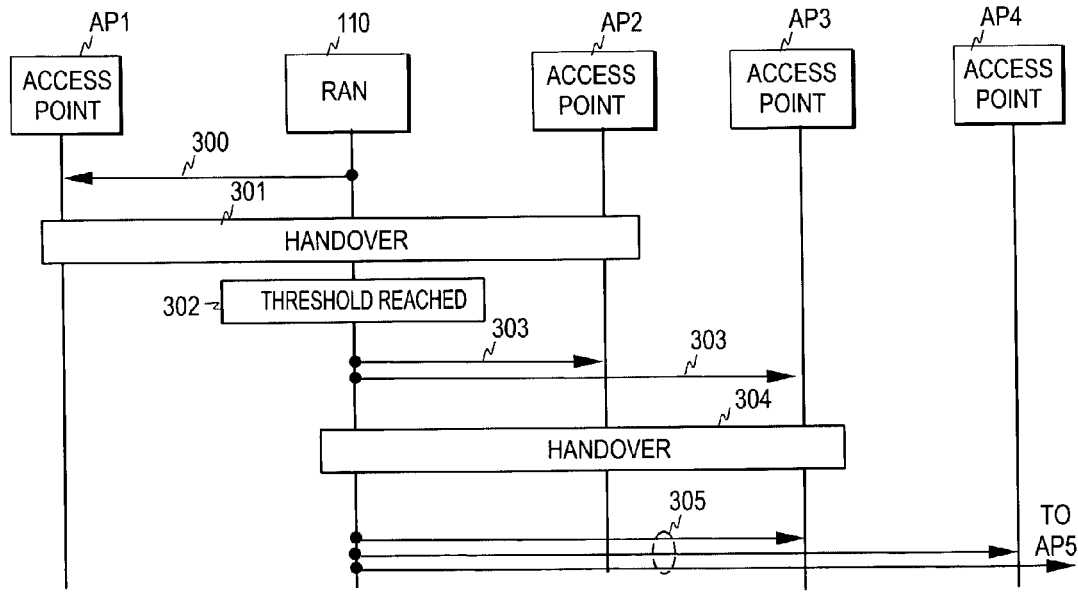
FIG. 3 shows an example of multicast transmission according to the invention.

FIG. 3 illustrates an example of the method according to the invention. The mobile node is first in the coverage area of access point AP1 and moving slowly towards access point AP2. The speed of the mobile is below the threshold v1, whereby the data destined for the node is delivered to the current access point only (step 300). After handover to the access point AP2 (step 301), the speed of the mobile increases until the threshold value is reached (step 302). In response to this event, the multicast-based mode is entered and the data of the mobile is delivered to the current access point AP2 and to the potential access point AP3 (step 303), i.e. in this case the set of potential access points contains only one access point. As the node continues its movement, it is soon handed over to access point AP3 (step 304). After the handover, the data is delivered to access points AP4 and AP5 (not shown), in addition to the current access point.

In mobile networks the multicasting of the data to potential access points is implemented applying the same procedures used to reroute traffic in connection with a handover, although the data is transmitted in advance and buffered in the access points. In an IP environment the multicasting may be performed by assigning a unique multicast address to the mobile node when the multicast-based mode is entered. In the multicast-based mode, the corresponding multicast group (i.e. the group of access points associated with the mobile node) is controlled according to the above-described principles, and the multicast tree is updated accordingly. In a preferred embodiment, the data available at a wireless access point is transmitted through the air interface only in the cell where the mobile node actually is. When the mobile node registers with an access point, or otherwise indicates its presence and willingness to receive the data, the buffered data is forwarded to it. The mobile may also choose whether it uses a single connection (in order to avoid interference, for example) or whether it receives data from a plurality of access points (diversity technique). This choice may be based on various criteria.

Figure 4:
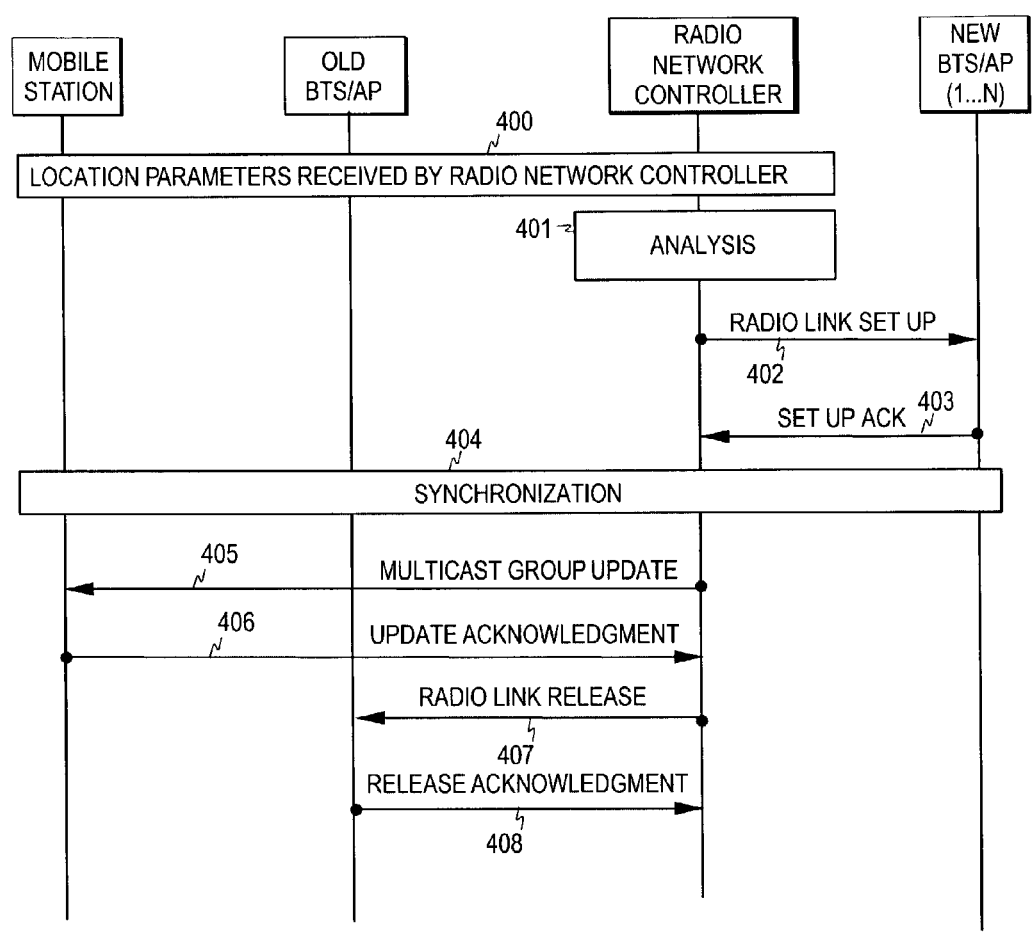
FIG. 4 illustrates the setting up of radio resources in the multicast-based mode.

FIG. 4 shows an example of the maintenance of radio resources in the multicast-based mode. It is assumed here that the Radio Network Controller receives the location parameters (step 400) from the mobile station. The location parameters may include a set of measured or determined values from which the location coordinates of the mobile can be derived. The required location information can also be provided by the Serving Mobile Location Center or the corresponding network element/server. Based on these parameters and possibly on other predefined and measured radio resource management parameters in the radio access network database, the RNC performs an analysis according to the invention, i.e. it decides on the operation mode and updates the set of potential access points (step 401). Once the set has been updated, the RNC queries whether the required resources, i.e. the new radio links, are available (step 402). If so, the RNC receives an acknowledgment (step 403) confirming that the required resources can be assigned for this purpose. If the data destined for the mobile is to be transmitted through several access points, the said access points and the mobile are then synchronized (step 404). This step might be necessary if the data is to be received in the correct sequence through several access points. On the other hand, this step is not necessary if the data is to be transmitted through only one of said access points. The RNC then informs the mobile station about the update of its multicast group or asks the mobile to update its multicast group, depending on the party which performs said update (step 405). The multicast group can be organized based on unique identities used in the relevant network environment, such as cell IDs, Medium Access Control (MAC) IDs, link-local IDs, or IP addresses. Having performed this, the mobile station sends an acknowledgment to the RNC (step 406).

When the update of the multicast group is complete, the RNC checks whether the modifications were such that there are access points which were removed from the set. If this is the case, the RNC instructs (step 407) the relevant access points to cancel the reservation of the corresponding radio link(s). Each cancellation is acknowledged to the RNC (step 408).

The maintenance of the potential access points associated with the mobile nodes can be implemented in different ways. A straightforward solution is to maintain for each mobile a data structure, such as a table, including an item such as a row indicating the potential access points currently. An alternative is to use predefined sets and update the identifier of the current set of the mobile when necessary. The predefined sets can be formed hierarchically; one set can be a subset of another set. Different levels of hierarchy can then correspond to different ranges of the variable monitored, such as different speed or coordinate ranges.

Different quantities, such as location and/or speed, can be used as the variables to be monitored, and different quantities can be measured to obtain an estimation of the current value of the variable to be monitored. Once the multicast groups of APs or wireless routers have been established, based on the target criteria such as location information, QoS, service availability, and so on, the process of data multicasting can be performed using different strategies. For instance, the APs could be grouped into sub-areas based on a single criterion or a set of criteria mentioned herein, and then data could be multicast to each sub-area sequentially, starting from the sub-area with the highest probability of serving the mobile node at the next instant. Alternatively, the data could be multicast simultaneously over a set of sub-areas.

When determining the thresholds, the operation of the system may also be made dependent on various other factors, in addition to those being derived from the location parameters, such as bitrate, QoS, service type, signal strength, or any combination of factors. For example, the threshold determining the entrance into the multicast-based mode may depend, in addition to the speed and/or current location, on the bitrate of the node. For example, if the speed threshold is exceeded, the multicast-based mode is entered only if the bitrate is low enough. A higher bitrate then prohibits the multicast-based mode, due to the excessive consumption of network resources. As mentioned above, the rules for selecting the potential access points may also vary depending on the environmental and/or topological information associated with the current location of the node.

The selection of the operation mode can be triggered by any predetermined event or a combination of events appropriate for the mobile node in question in order to update the set of potential access points. It is therefore to be understood that the term "event" in this context includes all these alternatives. The selection can be triggered by a single event only, such as the expiration of a timer or the entrance of the mobile node into a predefined area surrounding an access point, or by an event belonging to a group of predetermined events. The selection can also be triggered by an event indicating that the current conditions of the mobile fulfill certain criteria, such as a certain change in the speed of the mobile. If a timer is used to trigger a new selection, the timer can be set to a predetermined fixed value or to a value which depends on the movement of the node and on the network characteristics, such as the speed of the node and/or the distance between consecutive access points. It is thus possible, especially if a short fixed interval is used between two consecutive selections, that the same set of access points is selected several times before a different set is selected. However, the proper use of the thresholds and the triggering events should prevent this and guarantee that either the set of access points changes frequently in the multicast-based mode or the mobile returns to the normal operation mode.

The selection of the operation mode can also be triggered by the initiation of a service requiring seamless connectivity. Similarly, the type of the traffic of the mobile node can be a factor triggering the selection of the operation mode. For example, when the traffic type changes to a type requiring seamless connections, the selection of the operation mode is repeated. The method can be applied to a group of mobiles only, i.e. to mobiles requiring high quality service in terms of connectivity. This can be a fixed group or a dynamically changing group.

The transmission of the data to the potential access points does not necessarily have to be performed immediately in response to the selection of the access points; the selection process can determine the moment for the transmission. For example, the selection process can use the location and mobility information to determine a moment closer to the upcoming handover.

The same variables and criteria can be applied to all mobile nodes, although it is also possible that they are node-specific. The mobile nodes may also be divided into different categories with respect to the variables and/or criteria used.

Figure 5:
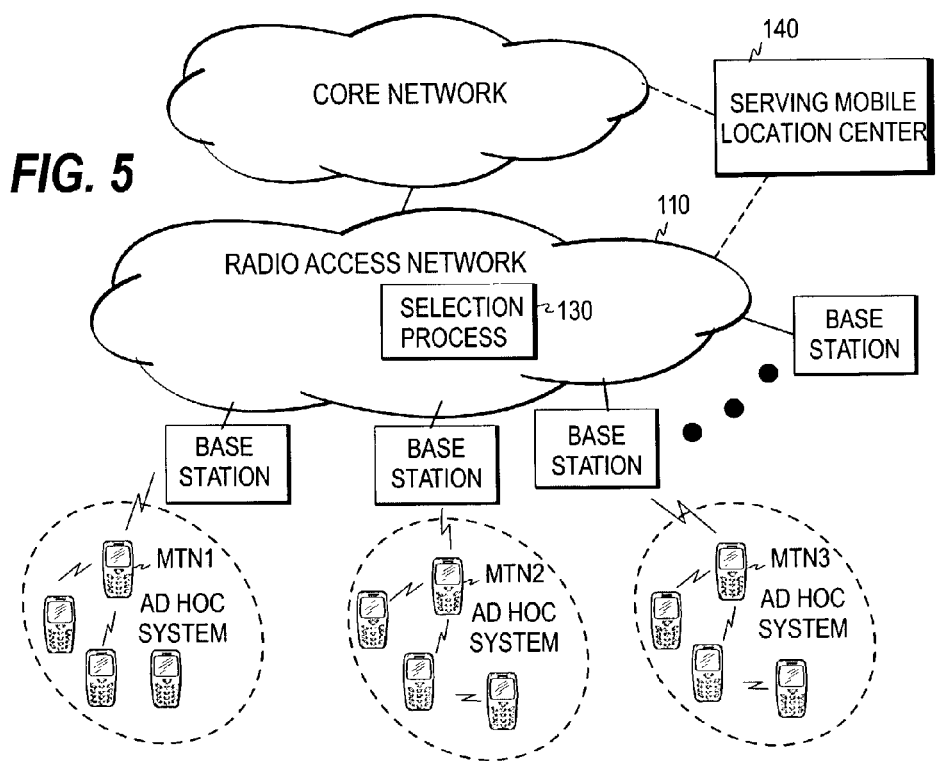
FIG. 5 illustrates another communication system in which the present invention can be applied.

The invention can also be applied in different types of networks and network architectures, for example, in the emerging ad hoc systems where the access points are typically mobile nodes. This is illustrated in FIG. 5, where each of the mobile trunk nodes MTN1 to MTN3 serves as the access point for the mobiles in its ad hoc system. In this case, the mobility pattern of the mobile trunk nodes can also be utilized in determining the operation mode and the set of possible access points. Thus, the invention can be applied at different levels of a communication system.

The functions required by the selection process according to the invention can reside in one network element, or they can be distributed in the network. For example, the variables can be determined in one network element, whereas the operation mode is selected in another. However, it is desirable that the selection process is centralized to one existing network element, which receives the location parameters available in the network and performs the method according to the invention. As mentioned above, the RNC or a separate server co-located at the RNC can be such an element.

It was assumed above that the location method used is network-based, whereby the Serving Mobile Location Center provides the location parameters and no support is required from the mobile node. However, the functionalities required by the invention may also be divided between the mobile node and the network. The determination of the location parameters may therefore also be mobile-assisted or mobile-based, as described above. The mobile node may even determine the variable to be monitored, such as its speed, and inform the network about the current mode of operation selected or about the current variable(s). In the latter case the decision for the operation mode is made in the network.

The criteria for entering and/or leaving the multicast-based mode can be dynamically controllable based on network conditions, such as traffic load. In this way the number of mobiles to which the method is applied can be controlled according to the conditions in the network.

The operation of the system was discussed above with respect to the multicast-based mode. In the normal operation mode, procedures normal in the environment in question are used. For example, in mobile networks normal handover procedures are used to reroute the traffic, whereas in an IP environment tunneling to the new care-of-address and route optimization can be used.

Although the invention was described above with reference to the examples shown in the appended drawings, it is obvious that the invention is not limited to these, but may be modified by those skilled in the art without departing from the scope and spirit of the invention. As mentioned above, the method of the invention can also be applied to both multicast traffic, whereby the same data is transmitted to several mobile nodes, and to unicast traffic, where the data is transmitted to one mobile node only.

What is claimed is:

1. A transmission method for a communication system comprising a plurality of mobile nodes (MN, MTN) and an access network (110) with a plurality of access points (AP, MTN) through which the mobile nodes are connected to the access network, the method comprising the steps of
storing location-dependent parameter sets, each parameter set containing at least one parameter indicative of the location of a mobile node,
monitoring a group of variables associated with the mobile node, the group containing at least one variable of which at least one is derived from the at least one parameter,
comparing the current value of said at least one variable with predetermined first criteria, and
selecting a multicast-based operation mode in which data destined for the mobile node is to be transmitted (1) to the current access point and (2) to a set of potential new access points prior to a handover, the multicast-based operation mode being selected when the step of comparing indicates that said at least one variable meets the predetermined first criteria.

2. A method according to claim 1, further comprising the steps of
monitoring the occurrence of a predetermined event and in response to said event, repeating said comparing step in order to test whether the multicast-based operation mode is to be selected.

3. A method according to claim 2, wherein said predetermined event is a handover performed for the mobile node.

4. A method according to claim 2, wherein said predetermined event is the expiration of a timer.

5. A method according to claim 2, wherein said predetermined event is the entrance of the mobile node to a predefined area.

6. A method according to claim 2, wherein said predetermined event is the initiation of a predetermined service by a mobile node.

7. A method according to claim 1, further comprising the step of estimating the current location of the mobile node on the basis of the parameter sets.

8. A method according to claim 7, further comprising the step of determining the speed of the mobile node on the basis of the estimating step, whereby said group includes the speed of the mobile node as the variable derived from the at least one parameter.

9. A method according to claim 8, wherein said group further includes the bitrate of the data destined for the mobile node.

10. A method according to claim 8, wherein said group further includes the type of the service carried by the data destined for the mobile node.

11. A method according to claim 7, further comprising the step of determining the speed and the direction of movement of the mobile node based on the estimating step, whereby said group includes the speed and the direction of movement of the mobile node as the variables derived from the at least one parameter.

12. A method according to claim 7, wherein said estimating step is performed without the assistance of the mobile node.

13. A method according to claim 7, wherein said estimating step is mobile node-assisted.

14. A method according to claim 7, wherein said estimating step is mobile node-based.

15. A method according to claim 7, wherein said group includes the current location of the mobile node.

16. A method according to claim 1, wherein a plurality of mobile nodes are monitored, the said at least one variable being the same for all said mobile nodes.

17. A method according to claim 1, further comprising the step of
changing from the multicast-based operation mode when the step of comparing indicates that said at least one variable meets predetermined second criteria.

18. A method according to claim 17, further comprising the step of dynamically controlling said first and second criteria.

19. A system for the transmission of data in a communication system comprising a plurality of mobile nodes (MN, MTN) and an access network with a plurality of access points (AP, MTN) through which the mobile nodes are connected to the access network, the system comprising
positioning means for determining location-dependent parameter sets, each parameter set containing at least one parameter indicative of the location of a mobile node,
calculation means for forming a group of variables associated with the mobile node, the group containing at least one variable of which at least one is derived from the at least one parameter,
comparison means for comparing the current value of said at least one variable with predetermined criteria, and
selection means for selecting a multicast-based operation mode, in which data destined for the mobile node is to be transmitted to the current access point and to a set of potential new access points prior to a handover, the selection means being configured to select the multicast-based mode when said at least one variable meets predetermined first criteria.

20. A system according to claim 19, wherein the selection means are located in the access network.

21. A system according to claim 20, wherein the calculation and comparison means are located in the access network.

22. A system according to claim 20, wherein at least one of the access points is a mobile node.

23. A network element for a communication system comprising a plurality of mobile nodes and an access network with a plurality of access points through which the mobile nodes are connected to the access network, the network element comprising
reception means for receiving location-dependent parameter sets, each parameter set containing at least one parameter indicative of the location of a mobile node,
calculation means for forming a group of variables associated with the mobile node, the group containing at least one variable of which at least one is derived from the at least one parameter,
comparison means for comparing the current value of said at least one variable with predetermined first criteria, and
selection means for selecting a multicast-based operation mode, in which data destined for the mobile node is to be transmitted to the current access point and to a set of potential new access points prior to a handover, the selection means being configured to select the multicast-based mode when said at least one variable meets the predetermined first criteria.

24. A network element according to claim 23, wherein said calculation means are adapted to form a group which includes the speed of the mobile node as a variable derived from said location parameters.

* * * * *